United States Patent [19]

Morris et al.

[11] Patent Number: 4,526,822
[45] Date of Patent: Jul. 2, 1985

[54] SHAPED ARTICLES FROM POLY(ETHYLENE TEREPHTHALATE) MODIFIED WITH TRANS-4,4'-STILBENEDICARBOXYLIC ACID

[75] Inventors: John C. Morris; Winston J. Jackson, Jr., both of Kingsport, Tenn.

[73] Assignee: Eastman Kodak Company, Rochester, N.Y.

[21] Appl. No.: 551,394

[22] Filed: Nov. 14, 1983

Related U.S. Application Data

[63] Continuation-in-part of Ser. No. 429,897, Sep. 30, 1982.

[51] Int. Cl.³ .................. B65D 00/00; B32B 7/02; C08G 63/54
[52] U.S. Cl. .................... 428/35; 428/221; 528/304; 528/279
[58] Field of Search .............. 428/35, 36, 364, 221, 428/480; 528/304, 279

[56] References Cited

U.S. PATENT DOCUMENTS 2,657,195 10/1953 Toland .................. 528/304
4,288,478 9/1981 Kinoshita et al. ............ 428/35

Primary Examiner—Marion E. McCamish
Assistant Examiner—Beverly K. Johnson
Attorney, Agent, or Firm—William P. Heath, Jr.; Daniel B. Reece, III

[57] ABSTRACT

Copolyesters of poly(ethylene terephthalate) modified with greater than 10 to about 40 mol % trans-4,4'-stilbenedicarboxylic acid can be melt spun to give as-spun fibers with exceptionally low shrinkage at elevated temperatures and with tensile strengths and moduli equivalent to those of fully oriented poly(ethylene terephthalate). They may be drafted to give fibers with tenacities >8 g/den and moduli >150 g/den. In addition to the unobviously high tenacities and moduli of as-spun fibers, oriented shaped articles, such as films and bottles, of copolyesters of this invention have lower gas permeabilities than poly(ethylene terephthalate). For example, the oxygen permeability of these copolyesters is 25 to 50% lower than that of poly(ethylene terephthalate).

6 Claims, 3 Drawing Figures

EFFECT OF TRANS-4,4'-STILBENEDICARBOXYLIC ACID CONTENT ON THE AS SPUN TENACITY OF POLY(ETHYLENE TEREPHTHALATE) SINGLE FILAMENTS

EFFECT OF
TRANS-4,4'-STILBENEDICARBOXYLIC ACID
CONTENT ON THE AS SPUN MODULUS OF
POLY(ETHYLENE TEREPHTHALATE)
SINGLE FILAMENTS

EFFECT OF
TRANS-4,4'-STILBENEDICARBOXYLIC ACID
CONTENT ON THE AS SPUN TENACITY OF
POLY(ETHYLENE TEREPHTHALATE)
SINGLE FILAMENTS

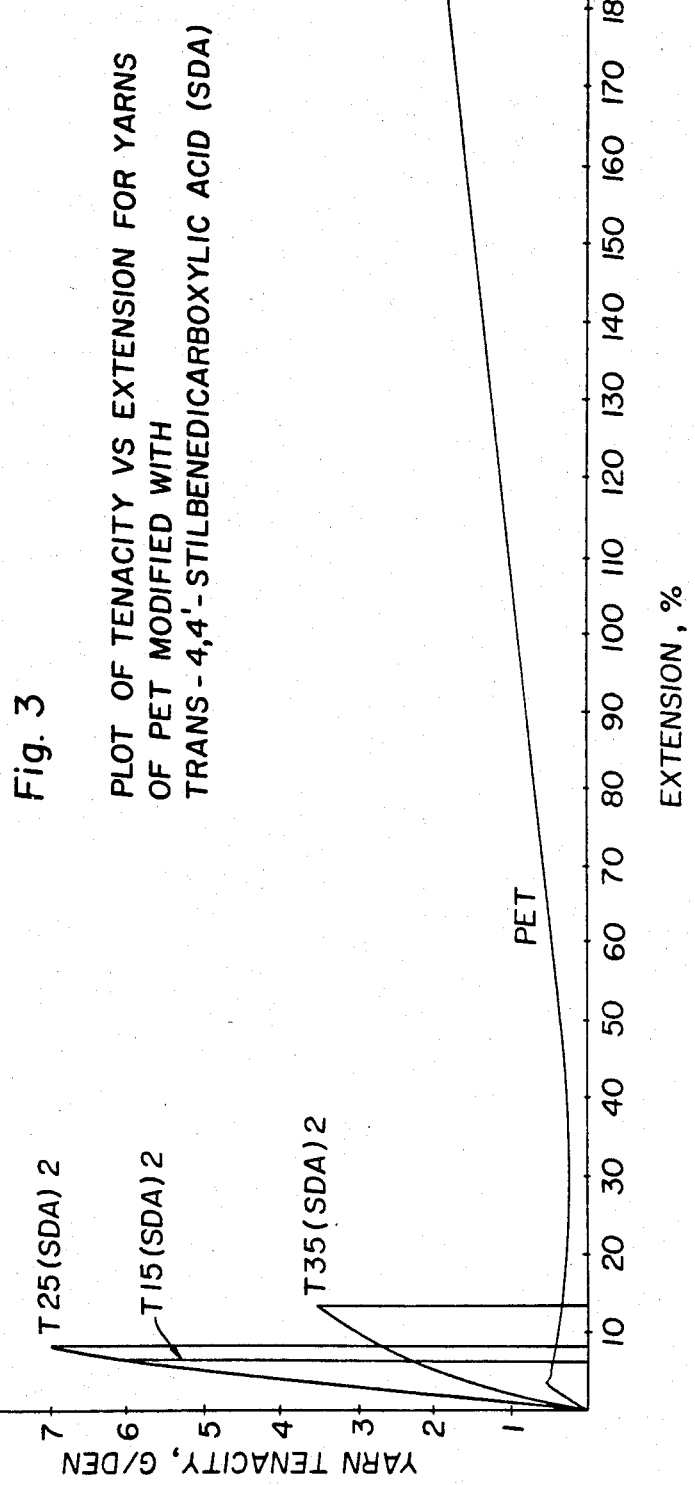

SHAPED ARTICLES FROM POLY(ETHYLENE TEREPHTHALATE) MODIFIED WITH TRANS-4,4'-STILBENEDICARBOXYLIC ACID

DESCRIPTION

1. Technical Field

The invention relates to fibers and shaped articles of high molecular weight copolyesters and is particularly concerned with the fibers and shaped articles of copolyesters of terephthalic acid, trans-4,4'-stilbenedicarboxylic acid, and ethylene glycol.

In addition to the unobviously high tenacities and moduli of as-spun fibers, oriented shaped articles, such as films and bottles, of copolyesters of this invention have lower gas permeabilities than poly(ethylene terephthalate). For example, the oxygen permeability of these copolyesters is 25 to 50% lower than poly(ethylene terephthalate).

2. Prior Art

Polyesters of stilbenedicarboxylic acid, terephthalic acid, and ethylene glycol are disclosed in U.S. Pat. No. 3,247,043, column 3, lines 24 to 38; in U.S. Pat. No. 3,842,041, column 2, lines 7 to 28; in U.S. Pat. No. 3,842,040, column 2, lines 8 to 27; and in U.S. Pat. No. 3,190,764, column 3, lines 25 to 36. No stilbenedicarboxylic acid examples are given.

U.S. Pat. No. 2,657,195 broadly discloses polymers prepared from aromatic acids, various isomeric stilbenedicarboxylic acids, and ethylene glycol. In particular, Example 6 describes a polyester prepared from 90 mol % dimethyl terephthalate, 10 mol % diethyl para, para'-stilbenedicarboxylate, and ethylene glycol. Likewise Example 7 illustrates a polyester prepared as in Example 6 using only 1 mol % diethyl para, para'-stilbenedicarboxylate. According to column 7, line 74, to column 8, line 1 the fiber of Example 7 had "good strength" and the fiber of Example 6 had "fair strength" (column 7, lines 59 and 60). The implication of these statements is that increasing the para, para'-stilbenedicarboxylic acid content of the polyesters reduces fiber strength.

British Polymer Journal, 13, 55 (1981) discloses homopolyesters of trans-4,4'-stilbenedicarboxylic acid and 1,5-pentanediol, 1,6-hexanediol, 1,10-decanediol and 2,2-dimethyl-1,3-propanediol. No terephthalic acid/trans-4,4'-stilbenedicarboxylic acid/ethylene glycol examples are disclosed.

DISCLOSURE OF THE INVENTION

The fibers of this invention comprise a copolyester containing repeating units from less than 90 to about 60 mol % terephthalic acid, greater than 10 to about 40 mol % trans-4,4'-stilbenedicarboxylic acid, and ethylene glycol, and said fiber as-spun is characterized by (1) a stress-strain curve that does not exhibit a yield region, (2) an elastic modulus of about 50 grams per denier or more, (3) hot air shrinkage at 190° C. of about 10% or less, and (4) boiling water shrinkage of about 8% or less. A portion of the terephthalic acid component of the copolyester may be replaced with up to about 15 mol % of at least one other dicarboxylic acid containing 3 to 20 carbon atoms. A portion of the ethylene glycol component of the copolyester may be replaced with up to about 15 mol % of at least one other glycol containing from 3 to 20 carbon atoms. The fibers of this invention may be further drafted to give a tenacity of at least 8 g/den and an elastic modulus of at least 150 g/den.

The fibers of this invention as-spun (see Table 1 for conditions) are essentially fully oriented, i.e. the stress-strain curve does not exhibit a yield region and the modulus decreases continuously after reaching a maximum when plotted against extension. The modulus at any given extension is given by the slope of the stress-extension curve.

The oriented shaped articles of this invention such as films or bottles have excellent gas barrier properties. Oriented shaped articles formed from a copolyester containing repeating units from less than 90 to about 60 mol % terephthalic acid, greater than 10 to about 40 mol % trans-4,4'-stilbenedicarboxylic acid and repeating units from ethylene glycol are characterized by oxygen permeability of less than 5 cc-mil/100 in$^2$-24 hr-atm. For example, the oxygen barier properties of the articles made from copolyesters of 85 to 65 mol % terephthalic acid, 15 to 35 mol % trans-4,4'-stilbenedicarboxylic acid and 100 mol % ethylene glycol is about 25 to 50 percent lower than like articles made from poly(ethylene terephthalate).

BRIEF DESCRIPTION OF THE DRAWINGS

FIG. 3 is a plot of yarn tenacity vs. extension for yarns made from fibers of this invention.

The fibers and oriented shaped articles of this invention are prepared from terephthalic acid or its esters, trans-4,4'-stilbenedicarboxylic acid or its esters, and ethylene glycol. Examples of useful acid esters are dimethyl, diethyl, dipropyl, dibutyl, diphenyl, or any combination of these as mixed esters. The terephthalic acid component of the polymer may be replaced with a substituted terephthalic acid such as 2-chloro-, 2-methyl-, 2-ethyl, 2-propyl-, 2,5-dichloro-, or 2,5-dimethylterephthalic acid as long as the unobviously high fiber and film properties and low gas permeability properties are retained. Terephthalic acid is preferred.

A portion of the terephthalic acid component may also be replaced with minor amounts of an isomeric stilbenedicarboxylic acid. For example, 3,3'-, 2,2'-, or 3,4'-trans-stilbenedicarboxylic acid may be used or even 3,3'-, 2,2'-, 3,4'-, or 4,4'-cis-stilbenedicarboxylic acid. Additionally the aromatic dicarboxylic acid portion may contain 1,4-, 1,5-, 2,6-, or 1,3-naphthalenedicarboxylic acid, isophthalic acid, or other modifiers. Portions of the glycol component of the polymer may be replaced with minor amounts of other glycols containing 3 to 20 carbon atoms such as 1,2-propanediol, neopentyl glycol, 1,3-propanediol, 1,4-butanediol, 2-methyl-1,4-butanediol, 1,6-hexanediol, and 1,4-cyclohexanedimethanol.

The trans-4,4'-stilbenedicarboxylic acid content of the polymer is greater than 10 to about 40 mol %, preferably about 15 to 30 mol % such that the sum of the total dicarboxylic acid content of the polymers is 100 mol %. The polymers should melt below about 340° C. so that the polymers can be melt processed on conventional spinning equipment. The inherent viscosities of the copolyesters are at least 0.4 and preferably at least 0.6. The polymers are prepared in the melt or by solid phase polymerization of ground polymer or by a combination of these processes.

Figure 2:
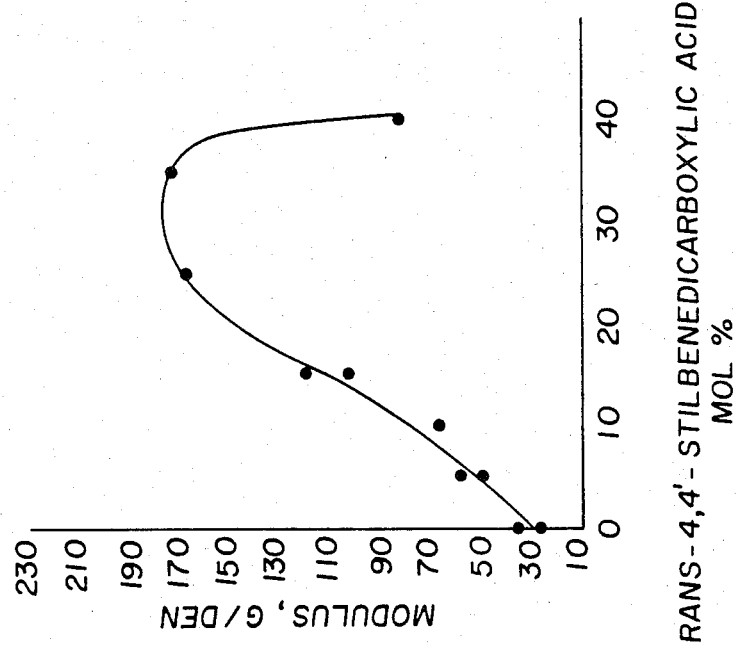
FIG. 2 is a curve showing the effect of trans-4,4'-stilbenedicarboxyic acid content on the as-spun modulus of single fibers of this invention.
Figure 1:
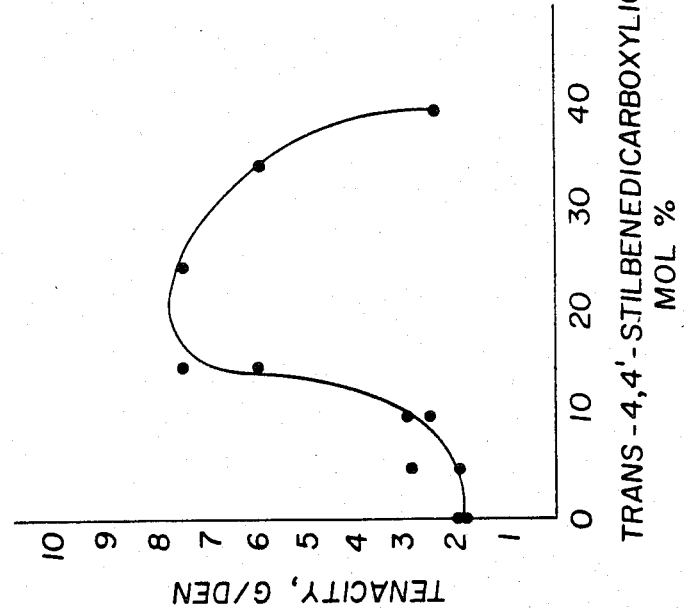
FIG. 1 is a curve showing the effect of trans-4,4'-stilbenedicarboxylic acid content on the as-spun tenacity of single fibers of our invention.

It is particularly noteworthy that the various stilbenedicarboxylic acid monomers are not distinguished from one another in U.S. Pat. No. 2,657,195. We found that greater than 10 to about 40 mol % trans-4,4'-stilbenedicarboxylic acid (SDA) significantly reduces the shrinkage of poly(ethylene terephthalate) (PET) copolyester fibers (see Table 1). Surprisingly, copolyesters modified with greater than 10 to about 40 mol % SDA have two to six times higher as-spun modulus and about 50 to 300% higher as-spun tensile strength compared to PET (FIGS. 1 and 2). In contrast, the as-spun fibers of PET copolyesters containing 15 to 25 mol % of trans-3,3'-stilbenedicarboxylic acid have less than half the tenacity (~3.5 g/den.) and about half or less than half the modulus of the comparable copolyesters prepared from trans-4,4'-stilbenedicarboxylic acid. PET and the polyesters of trans-3,3'-stilbenedicarboxylic acid showed very little change in modulus (<60 g/den) and tenacity (3.5 g/den to 4.5 g/den) when the spinning temperature was changed from 280° to 260° C. or the spinning speed from 3000 to 5000 ft/min. In contrast, the properties of copolyesters prepared from trans-4,4'-stilbenedicarboxylic acid showed an increase in tenacity from 5.8 g/den to 7.9 g/den tenacity and an increase in modulus from 155 g/den to 169 g/den under those conditions.

A preferred method of blowing the bottles of this invention involves the use of a RHB-VII three-lane, two-stage reheat blowing machine designed to produce one-half liter bottles. This machine is manufactured by Cincinnati Milacron, Plastics Machinery Division of Batavia, Ohio. The machine comprises a parison or preform carrier loading unit, a preform carrier and conveyer system, a three-lane heating system, double-acting toggle clamp unit, bottle ejection system and a programmable control system.

In this system preforms are conveyed from a floor level hopper to an unscrambler unit at the top of the machine. Here preforms are unscrambled and directed to three individual lane-loaders each capable of loading three preforms at a time. Then elevators reach up, take three preforms each (in neck-down position), and place them in carriers (once preforms are in place on the carriers, they remain there until ejected as finished bottles). Carriers then advance to a quartz heating unit, the preforms pass (neck up) through the heating unit, rotating as they travel, to assure uniform heat distribution.

At the end of the heat zone, rotation stops and the preforms pass into an equilibration zone where heat in the preform walls is allowed to stablize at the precise temperature for the blowing process. From this zone, the preforms advance to the blow station where a 75-ton toggle clamp closes the blow molds around the preforms. Stuffer noses advance to form an air seal on the top of the carrier. At the same time the center rods are inserted into the preforms and air is introduced around the rods, blowing the preforms radially and axially. When the processing is completed, the center rods and stuffer noses retract and the blown bottles advance to the eject station. Here the bottles are released from the carriers, dropping through guide tubes into take-away equipment.

Oriented films of this invention are produced using well known commercial processes.

The following examples illustrate the unobviously high as-spun tensile strength and modulus and low shrinkage of fibers of copolyesters of terephthalic acid, trans-4,4'-stilbenedicarboxylic acid, and ethylene glycol and the unobvious gas barrier properties of oriented shaped articles made from the copolyesters.

All inherent viscosities are determined at 25° C. in 60/40 (wt/wt) phenol/tetrachloroethane (PTCE) at a concentration of 0.5 g/100 mL.

The polyesters are dried at 110° C. in a vacuum oven overnight. The polymers in FIGS. 1 and 2 (Examples 1–11) are spun on an Instron Melt Rheometer Model 3211 through a capillary (length 0.042 inch and diameter 0.014 inch) equipped with a capillary heater. The design of the capillary allows use of a filtering system consisting of 0.4 g 40/60 mesh sand or 0.4 g 40/80 mesh stainless steel powder supported by two 60-micron screens. Tensile properties of the fibers are determined using a standard one-inch gauge length for single filaments. Fibers are glued to a paper substrate prior to tensile testing to reduce damage to the single filaments from the clamps.

The polymers in Table 1 are spun on conventional spinning equipment which consists of a screw extruder and gear pump equipped with a spinneret having 10 holes, 0.3 mm in diameter (length to diameter ratio of 2) and a filter screen and/or sand pack assembly. Yarn tensile properties are determined using a standard five-inch gauge length. Shrinkage properties in boiling water and 190° C. air are determined on yarn samples as follows. A 90-cm yarn sample is measured and weighed to the nearest denier. The ends of the sample are tied together to form a loop and a weight of 0.1 gram per denier of yarn is hung on the loop. The length of the loop with the weight on it is measured, then the weight is removed and the loop sample is immersed in boiling water or exposed to 190° C. air for 10 minutes. The loop sample is removed from the heat source, the weight is placed back on the yarn loop, and the length of the loop is measured again. The percent shrinkage is the absolute difference of the length of the loop measurement divided by the initial loop length multipled by 100.

TABLE 1

Effect of Trans-4,4'-Stilbenedicarboxylic Acid (SDA) Content On The As-Spun Shrinkage of Poly(ethylene terephthalate) Copolyesters

| SDA Mol % | Polymer I.V. | Winding Speed m/min | Spinning Temp. °C. | Den/Fil | Tenacity G/Den | Elastic Modulus G/Den | BWS[1] % | HAS[2] % |
|---|---|---|---|---|---|---|---|---|
| 0 | 0.60 | 3000 | 284 | 4.0 | 1.9 | 12 | 69 | 74 |
|   | 0.68 | 2000 | 280 | — | 2.4 | 25 | 66 | 59 |
| 5 | 0.62 | 3025 | 285 | 2.1 | 3.0 | 42 | 16 | 23 |
|   | 0.70 | 3012 | 285 | 2.6 | 2.7 | 40 | 10 | 15 |
| 10 | 0.64 | 3015 | 275 | 2.2 | 3.6 | 72 | 7 | 8 |
|   | 0.72 | 3007 | 275 | 3.2 | 2.9 | 74 | 6 | 4 |
| 15 | 0.72 | 3000 | 280 | 3.1 | 5.0 | 98 | 2 | 4 |
| 25 | 0.65 | 3000 | 270 | 2.5 | 5.5 | 104 | 1 | 3 |

TABLE 1-continued

Effect of Trans-4,4'-Stilbenedicarboxylic
Acid (SDA) Content On The As-Spun Shrinkage
of Poly(ethylene terephthalate) Copolyesters

| SDA Mol % | Polymer I.V. | Winding Speed m/min | Spinning Temp. °C. | Den/Fil | Tenacity G/Den | Elastic Modulus G/Den | BWS[1] % | HAS[2] % |
|---|---|---|---|---|---|---|---|---|
|  | 0.71 | 3150 | 300 | 2.0 | 6.8 | 127 | 2 | 4 |
| 35 | 0.62 | 1500 | 326 | 3.0 | 3.5 | 113 | 1 | 4 |

[1]Boiling water shrinkage.
[2]Hot air shrinkage at 190° C.

Table 1 illustrates the effect of SDA content on the shrinkage properties of poly(ethylene terephthalate). FIGS. 1 and 2 (data taken from Examples 1–11) show the effect of trans-4,4'-stilbenedicarboxylic acid (SDA) content on tensile strength and modulus of poly(ethylene terephthalate). FIG. 3 is a plot of yarn tenacity vs. extension of yarns made from fibers of this invention. The polymers are spun on a ¾-inch screw extruder equipped with a gear pump through a capillary containing 10 holes of length 0.6 mm and diameter 0.3 mm. The polymers are spun as follows:

|  | Winding Speed, m/min | Spinning Temp., °C. | Yarn Tenacity, G/Den | Yarn Modulus, G/Den |
|---|---|---|---|---|
| PET | 2000 | 280 | 1.9 | 12 |
|  | 3000 | 290 | 2.7 | 18 |
| T15(SDA)2 | 2000 | 270 | 5.9 | 113 |
| T25(SDA)2 | 2550 | 300 | 6.8 | 127 |
| T35(SDA)2 | 1500 | 326 | 3.5 | 113 |

EXAMPLE 1

This example illustrates the preparation and spinning of a copolyester of 75 mol % terephthalic acid, 25 mol % trans-4,4'-stilbenedicarboxylic acid, and 100 mol % ethylene glycol.

A mixture of 87.3 g (0.45 mol) dimethyl terephthalate, 48.6 g (0.15 mol), diethyl trans-4,4'-stilbenedicarboxylate, 74.4 g (1.2 mol) ethylene glycol, 0.047 g zinc acetate, 0.077 g antimony triacetate, and 0.020 g titanium isopropoxide is placed in a 500 mL flask equipped with an inlet for nitrogen, a metal stirrer and a short distillation column. The flask is heated by a Wood's metal bath at 180° C. for two hours, 190° C. for one hour, 220° C. for ¾ hour, 240° C. for ½ hour and 275° C. for ¼ hour. A vacuum of 0.5 mm is gradually applied over the next 15 minutes and full vacuum is maintained for about 25 to 30 minutes. A high melt viscosity, light yellow polymer which crystallizes on cooling is obtained which has an inherent viscosity of 0.80.

The polymer is ground to pass a 3-mm screen, dried at 110° C. in a vacuum oven, and spun on the Instron rheometer, using an extrusion rate of 0.2 cm/min at 275° C. The fiber is taken up at 3000 ft/min and has 1.6 den/fil, 7.4 g/den tenacity, and 169 g/den modulus.

EXAMPLE 2

This example illustrates the preparation and spinning of a copolyester of 85 mol % terephthalic acid, 15 mol % trans-4,4'-stilbenedicarboxylic acid, and 100 mol % ethylene glycol.

A mixture of 98.9 g (0.51 mol) dimethyl terephthalate, 29.2 g (0.09 mol), diethyl trans-4,4'-stilbenedicarboxylate, 74.4 g (1.20 mol) ethylene glycol, 0.044 g zinc acetate, 0.70 g antimony triacetate, and 0.018 g titanium isopropoxide is placed in a 500 mL flask equipped with an inlet for nitrogen, a metal stirrer and a short distillation column. The flask is heated in a Wood's metal bath for two hours at 180° C., one hour at 200° C., ½ hour at 220° C., and ½ hour at 250° C. Finally the temperature is raised to 275° C. and a vacuum of 0.5 mm is gradually applied. Full vacuum is maintained for 25 minutes. A high melt viscosity, light yellow crystalline polymer is obtained having an inherent viscosity of 0.75.

The polymer is ground to pass a 3-mm screen, dried at 110° C. in a vacuum oven and spun on the Instron rheometer using an extrusion rate of 0.2 cm/min at 280° C. The fiber is taken up at 3000 ft/min and has 1.5 den/fil, 6.0 g/den tenacity, and 97 g/den modulus. Drafting the fiber using conventional techniques raises the tenacity above 7.0 g/den and the modulus above 150 g/den.

EXAMPLE 3

Polymer prepared according to Example 2 is solid phase polymerized by heating ground polymer one hour at 110° C., ½ hour at 180° C., ½ hour at 200° C., and ½ hour at 220° C. The inherent viscosity of the polymer is raised to 0.97. The polymer is spun at 310° C. in a manner similar to that described in Examples 1 and 2. Fiber is taken up at 3000 ft/min and has 1.5 den/fil, an increased tenacity (7.5 g/den) and an increased modulus (121 g/den).

EXAMPLE 4

For comparative purposes, poly(ethylene terephthalate) with an I.V. of 0.70 is melt spun, using the procedures of Example 1, at 280° C. to give a 1.7 denier fiber with 1.9 g/den tenacity and 27.2 g/den modulus.

EXAMPLE 5

For comparative purposes, poly(ethylene terephthalate) with an I.V. of 0.85 is melt spun using the procedure of Example 1 at 280° C. to give a 1.6 denier fiber with 2.0 g/den tenacity and 36 g/den modulus.

EXAMPLE 6

A polyester of 95 mol % terephthalic acid, 5 mol % trans-4,4'-stilbenedicarboxylic acid, and ethylene glycol is prepared as in Example 1 to an I.V. of 0.81. The polymer is melt spun at 270°–275° C. to give a 1.7 denier fiber with 2.9 g/den tenacity and 58 g/den modulus.

EXAMPLE 7

A polyester of 95 mol % terephthalic acid, 5 mol % trans-4,4,-stilbenedicarboxylic acid, and ethylene glycol is prepared as in Example 1 to an I.V. of 0.64. The polymer is melt spun at 280° C. to give a 1.8 denier fiber with 1.9 g/den tenacity and 49 g/den modulus.

EXAMPLE 8

A polyester of 90 mol % terephthalic acid, 10 mol % trans-4,4'-stilbenedicarboxylic acid, and ethylene glycol is prepared as in Example 1 to an I.V. of 0.66. The polymer is melt spun at 260° C. to give a 1.6 denier fiber with 3.1 g/den tenacity and 67 g/den modulus.

EXAMPLE 9

A polyester of 90 mol % terephthalic acid, 10 mol % trans-4,4'-stilbenedicarboxylic acid, and ethylene glycol is prepared as in Example 1 to an I.V. of 0.85. The polymer is melt spun at 290° C. to give a 2.6 denier fiber with 4.0 g/den tenacity and 66 g/den modulus.

EXAMPLE 10

A polyester of 65 mol % terephthalic acid, 35 mol % trans-4,4'-stilbenedicarboxylic acid, and ethylene glycol is prepared in the melt as in Example 1 and solid phase polymerized as described in Example 3 to an I.V. of 0.75. The polymer is melt spun on the Instron rheometer with the barrel at 300° C. and the capillary at 340° C. to give a 1.8 denier fiber with 6.1 g/den tenacity and 173 g/den modulus.

EXAMPLE 11

A polyester of 60 mol % terephthalic acid, 40 mol % trans-4,4'-stilbenedicarboxylic acid, and ethylene glycol is prepared in the melt as in Example 1 and then solid phase polymerized as described in Example 3. The polymer is not completely soluble in the I.V. solvent. The polymer is spun with difficulty without the filtering system with the Instron barrel at 300° C. and the capillary at 350° C. The 3.1 denier fiber has 2.4 g/den tenacity and 83 g/den modulus.

The following examples, which are listed in Table 2, illustrate the excellent gas barrier properties of copolyesters of 100 mol % terephthalic acid, 15 to 35 mol % trans-4,4'-stilbenedicarboxylic acid, and 100 mol % ethylene glycol.

Orientation of the copolyesters of this invention, which is essential to obtain the improved gas barrier properties, is accomplished during a post-melt treatment of the polymer (e.g., blown film) or after preheating the copolyesters above the polymer Tg prior to forming (e.g., stretch-blown bottles or biaxially oriented film).

The copolyesters are extruded in the range of 260° to 300° C. onto a hot roll heated at 80° to 100° C. and then wound up to give film 20 mils in thickness. Extruded films are biaxially oriented 300% at least 10° to 20° C. above the polymer Tg on a T.M. Long film stretcher. The oxygen permeability of the films is determined at 30° C. using a MoCon Oxtran 10/50 permeability tester.

EXAMPLE 12

For comparative purposes, poly(ethylene terephthalate) with an I.V. of 0.72 is extruded into 20-mil film at 280° C. The extruded film has an oxygen permeability of 9.9 cc-mil/100 in$^2$-24 hr-atm. The film is biaxially oriented 300% at 100° C. to give a film with an oxygen permeability of 6.1 cc-mil/100 in$^2$-24 hr-atm.

EXAMPLE 13

For comparative purposes, a polyester of 90 mol % terephthalic acid, 10 mol % trans-4,4'-stilbenedicarboxylic acid, and ethylene glycol is prepared as in Example 1 to an I.V. of 0.76. The polyester is extruded at 280° C. into 20-mil film and biaxially oriented 300% at 90° C. The extruded film has an oxygen permeability of 10.0 cc-mil/100 in$^2$-24 hr-atm, and the biaxially oriented film has an oxygen permeability of 6.1 cc-mil/100 in$^2$-24 hr-atm, the same as that of poly(ethylene terephthalate) (PET) in Example 12.

EXAMPLE 14

A copolyester having the same composition as Example 2 (PET modified with 15 mol % trans-4,4'-stilbenedicarboxylic acid) and an I.V. of 0.74 is extruded at 280° C. into 20-mil film and biaxially oriented 300% at 100° C. The extruded film has an oxygen permeability of 11.1 cc-mil/100 in$^2$-24 hr-atm, but the biaxially oriented film has an oxygen permeability of 4.6 cc-mil/100 in$^2$-24 hr-atm, about 25% lower than PET.

EXAMPLE 15

A polyester having the same composition of Example 1 (PET modified with 25 mol % trans-4,4'-stilbenedicarboxylic acid) and an I.V. of 0.68 is extruded at 300° C. into 20-mil film and biaxially oriented 300% at 110° C. The extruded film has an oxygen permeability of 10.4 cc-mil/100 in$^2$-24 hr-atm, and the biaxially oriented film has an oxygen permeability of 3.1 cc-mil/100 in$^2$-24 hr-atm, 50% lower than PET.

EXAMPLE 16

A polyester of 70 mol % terephthalic acid units, 30 mol % trans-4,4'-stilbenedicarboxylic acid units, and 100 mol % of ethylene glycol units is prepared according to the procedures of Example 1 to an I.V. of 0.90. The polymer is extruded at 300° C. into 20-mil film and biaxially oriented 300% at 115° C. The extruded film has an oxygen permeability of 8.3 cc-mil/100 in$^2$-24 hr-atm, and the biaxially oriented film has an oxygen permeability of 2.8 cc-mil/100 in$^2$-24 hr-atm.

EXAMPLE 17

A polyester of 68 mol % terepathalic acid units, 32 mol % trans-4,4'-stilbenedicarboxylic acid units and 100 mol % ethylene glycol units is prepared according to the procedures of Example 1 to an I.V. of 0.88 and extruded into 20-mil film at 300° C. The extruded film has an oxygen permeability of 5.6 cc-mil/100 in$^2$-24 hr-atm, about 50% lower than PET. The film could not be biaxially oriented 300%. The film is biaxially oriented 200% at 110° C. to give a film with an oxygen permeability of 2.0 cc-mil/100 in$^2$-24 hr-atm.

EXAMPLE 18

The polymer prepared from 80 mol % terephthalic acid, 20 mol % trans-4,4'-stilbenedicarboxylic acid, and 100 mol % ethylene glycol is prepared as in Example 1 to an I.V. of 0.64. The polymer is solid phase polymerized to an I.V. of 0.71 and injection molded into one-half liter bottle parisons. The polymer is then reheated under quartz lamps above the polymer Tg to allow stretch blow-molding of the parison into one-half liter plastic beverage bottles. The bottle has an oxygen permeability of 3.6 cc-mil/100 in$^2$-24 hr-atm, compared to PET which has an oxygen permeability of 5.5 cc-mil/100 in$^2$-24 hr-atm.

TABLE 2

Oxygen Permeability of TPA/SDA/EG Copolyesters[a]

| SDA Content, Mol % | I.V. | Oxygen Permeability, cc-mil/100 in$^2$-24 hr-atm | | Example Number |
|---|---|---|---|---|
| | | Extruded | Oriented | |
| 0 | 0.72 | 9.9 | 6.1 | 12 |
| 10 | 0.76 | 10.0 | 6.1 | 13 |
| 15 | 0.74 | 11.1 | 4.6 | 14 |
| 25 | 0.68 | 10.4 | 3.1 | 15 |
| 30 | 0.90 | 8.3 | 2.8 | 16 |
| 32 | 0.88 | 5.6 | 2.0[b] | 17 |

[a]TPA = terephthalic acid
SDA = trans-4,4'-stilbenedicarboxylic acid
EG = ethylene glycol
[b]This polymer film is biaxially oriented 200%; the other polymers in the table are biaxially oriented 300%.

The invention has been described in detail with particular reference to preferred embodiments thereof, but it will be understood that variations and modifications can be effected within the spirit and scope of the invention.

We claim:

1. Oriented shaped article formed from a copolyester containing repeating units from less than 90 to about 60 mol % terephthalic acid, greater than 10 to about 40 mol % trans-4,4'-stilbenedicarboxylic acid and repeating units from ethylene glycol, said oriented shaped article being further characterized in that it has an oxygen permeability of less than 5 cc-mil/100 in$^2$-24 hr-atm.

2. Oriented shaped article of claim 1 wherein the repeating units of terephthalic acid are present in the amount of 85 to 65 mol %, the repeating units from trans-4,4'-stilbenedicarboxylic acid are present in the amount of 15 to 35 mol % and the repeating units from ethylene glycol are present in the amount of 100 mol %.

3. Oriented shaped article of claim 1 wherein up to about 15 mol % or the repeating units from the terephthalic acid component of the copolyester are replaced with repeating units from at least one other dicarboxylic acid containing 3 to 20 carbon atoms.

4. Oriented shaped article of claim 1 wherein up to about 15 mol % of the repeating units of the ethylene glycol is replaced with repeating units from at least one other glycol containing 3 to 20 carbon atoms.

5. Oriented shaped article of claim 1 wherein said article is a film.

6. Oriented shaped article of claim 1 wherein said article is a bottle.

* * * * *